US00RE50539E

(19) United States
(12) Reissued Patent
Chen

(10) Patent Number: US RE50,539 E
(45) Date of Reissued Patent: Aug. 19, 2025

(54) LUMINANCE COMPENSATION METHOD OF LIGHT-EMITTING DEVICE

(71) Applicant: LG Display Co., Ltd., Seoul (KR)

(72) Inventor: Hsien-Te Chen, Taipei (TW)

(73) Assignee: LG DISPLAY CO., LTD., Seoul (KR)

(21) Appl. No.: 18/651,393

(22) Filed: Apr. 30, 2024

Related U.S. Patent Documents

Reissue of:
(64) Patent No.: 10,796,628
Issued: Oct. 6, 2020
Appl. No.: 16/172,463
Filed: Oct. 26, 2018

(30) Foreign Application Priority Data

Oct. 27, 2017 (TW) ..... 106137214

(51) Int. Cl.
*G09G 3/32* (2016.01)
*G09G 3/34* (2006.01)
*H04N 5/367* (2011.01)

(52) U.S. Cl.
CPC ..... *G09G 3/32* (2013.01); *G09G 3/3426* (2013.01); *G09G 2310/0264* (2013.01); *G09G 2320/0233* (2013.01); *G09G 2320/029* (2013.01); *G09G 2320/0626* (2013.01); *G09G 2320/0633* (2013.01); *G09G 2360/147* (2013.01)

(58) Field of Classification Search
CPC ..... G09G 3/32; G09G 3/3426; G09G 2310/0264; G09G 2320/0233; G09G 2320/029; G09G 2320/0626; G09G 2320/0633; G09G 2360/147
See application file for complete search history.

(56) References Cited

U.S. PATENT DOCUMENTS

2009/0303227 A1* 12/2009 Hwang ..... G09G 3/2055 345/214
2011/0227958 A1* 9/2011 Park ..... G09G 3/20 345/88
2012/0129419 A1* 5/2012 Yoshimoto ..... G02F 1/136259 445/3
2013/0050528 A1* 2/2013 Hsu ..... H04N 23/843 348/E9.053
2014/0009729 A1* 1/2014 Otaki ..... B23K 26/0613 349/106
2014/0375920 A1* 12/2014 Bae ..... G02F 1/136259 349/42
2015/0145851 A1* 5/2015 Takeda ..... G09G 3/3233 345/212
2017/0352310 A1* 12/2017 Kim ..... G09G 3/2003
2018/0182279 A1* 6/2018 Sakariya ..... G09G 3/2014

* cited by examiner

*Primary Examiner* — Michael Roswell
(74) *Attorney, Agent, or Firm* — Birch, Stewart, Kolasch & Birch, LLP

(57) ABSTRACT

A luminance compensation method of a light-emitting device is disclosed. The light-emitting device has a plurality of light-emitting elements. The luminance compensation method includes following steps of: obtaining a position of at least one of the light-emitting elements in a brightness anomalous status; and changing a brightness of at least one of the light-emitting elements disposed adjacent to the light-emitting element in the brightness anomalous status for compensating a brightness of the light-emitting elements in the brightness anomalous status.

24 Claims, 4 Drawing Sheets

LUMINANCE COMPENSATION METHOD OF LIGHT-EMITTING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This [Non-provisional application] *is a new Reissue Application of U.S. Pat. No. 10,796,628, issued Oct. 6, 2020, which* claims priority under 35 U.S.C. § 119(a) on Patent Application [No(s)] *No.* 106137214 filed in Taiwan, Republic of China on [Oct.] *October* 27, 2017, the entire contents of which are hereby incorporated by reference.

BACKGROUND

Technology Field

The present disclosure relates to a luminance compensation method and, in particular, to a luminance compensation method of a light-emitting device.

Description of Related Art

The Mini LED display device or Micro LED display device includes the Mini LED array device (made of Mini LEDs) or Micro LED array device (made of Micro LEDs). Compared with the conventional LCD device, the Mini LED display device or Micro LED display device does not need the additional backlight source, so that the Mini LED display device or Micro LED display device can be manufactured lighter and thinner.

However, regarding the Mini LED display device or Micro LED display device, since the sides of the Mini LEDs or Micro LEDs are very small (e.g. 200 μm or less), it is very difficult to repair or replace these small-sized LEDs when the device has brightness anomalous.

SUMMARY

An objective of the present disclosure is to provide a luminance compensation method of a light-emitting device that can achieve the luminance compensation effect with lower repairing difficulty.

This disclosure provides a luminance compensation method of a light-emitting device. The light-emitting device comprises a plurality of light-emitting elements. The luminance compensation method comprises steps of: obtaining a position of at least one of the light-emitting elements in a brightness anomalous status; and changing a brightness of at least one of the light-emitting elements disposed adjacent to the light-emitting element in the brightness anomalous status for compensating a brightness of the light-emitting element in the brightness anomalous status.

In one embodiment, the position of the light-emitting element in the brightness anomalous status corresponds to a dark spot or a bright spot.

In one embodiment, before the step of obtaining the position of at least one of the light-emitting elements in the brightness anomalous status, the luminance compensation method further comprises a step of: turning on the light-emitting device according to at least one preset gray-level value.

In one embodiment, after the step of turning on the light-emitting device according to the preset gray-level value, the luminance compensation method further comprises a step of: retrieving an image of the light-emitting elements for determining the position of the light-emitting element in the brightness anomalous status.

In one embodiment, after the step of turning on the light-emitting device according to the preset gray-level value, the luminance compensation method further comprises a step of: measuring a voltage value or a current value of the light-emitting elements for determining the position of the light-emitting element in the brightness anomalous status.

In one embodiment, the step of changing the brightness of at least one of the light-emitting elements disposed adjacent to the light-emitting element in the brightness anomalous status for compensating the brightness of the light-emitting element in the brightness anomalous status is to change a brightness peak or a duty cycle of the at least one of the light-emitting elements disposed adjacent to the light-emitting element in the brightness anomalous status.

In one embodiment, there are N of the light-emitting elements spaced from the light-emitting element in the brightness anomalous status by a first distance, the N light-emitting elements emit light with a color the same as the light-emitting element in the brightness anomalous status, and there are M of the light-emitting elements configured for compensating the light-emitting element in the brightness anomalous status. Wherein, M is less than or equal to N, and M and N are respectively an integer greater than or equal to 1.

In one embodiment, the light-emitting element in the brightness anomalous status has a luminance L1, a difference between the luminance L1 and a normal luminance L is (L1−L), and a luminance of each of the M light-emitting elements configured for compensating the light-emitting element in the brightness anomalous status is between L and (L−(L1−L)).

In one embodiment, there are P of the light-emitting elements spaced from the light-emitting element in the brightness anomalous status by a second distance, the P light-emitting elements emit light with a color the same as the light-emitting element in the brightness anomalous status, and there are Q of the light-emitting elements configured for compensating the light-emitting element in the brightness anomalous status. Wherein, Q is less than or equal to P, and P and Q are respectively an integer greater than or equal to 1.

In one embodiment, the light-emitting element in the brightness anomalous status has a luminance L2, a difference between the luminance L2 and a normal luminance L is (L2−L), and a luminance of each of the Q light-emitting elements configured for compensating the light-emitting element in the brightness anomalous status is between L and (L−(L2−L)).

In one embodiment, before the step of changing the brightness of at least one of the light-emitting elements disposed adjacent to the light-emitting element in the brightness anomalous status for compensating the brightness of the light-emitting element in the brightness anomalous status, the luminance compensation method further comprises a step of: removing at least a part of a light-mixing preventing layer disposed between the light-emitting element in the brightness anomalous status and the at least one of the light-emitting elements disposed adjacent to the light-emitting element in the brightness anomalous status.

In one embodiment, the light-emitting element is a Mini LED or a Micro LED.

As mentioned above, the luminance compensation method of a light-emitting device of this disclosure is to obtain a position of at least one of the light-emitting elements in a brightness anomalous status, and then to change a brightness of at least one of the light-emitting elements disposed adjacent to the light-emitting element in the brightness anomalous status for compensating a brightness of the light-emitting element in the brightness anomalous status. Accordingly, this disclosure does not directly repair or replace the light-emitting element in the brightness anomalous status, but utilizes the normal light-emitting elements disposed adjacent to the light-emitting element in the brightness anomalous status for compensating the brightness of the light-emitting element in the brightness anomalous status. As a result, the luminance compensation method of this disclosure can achieve the luminance compensation effect with lower repairing difficulty.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
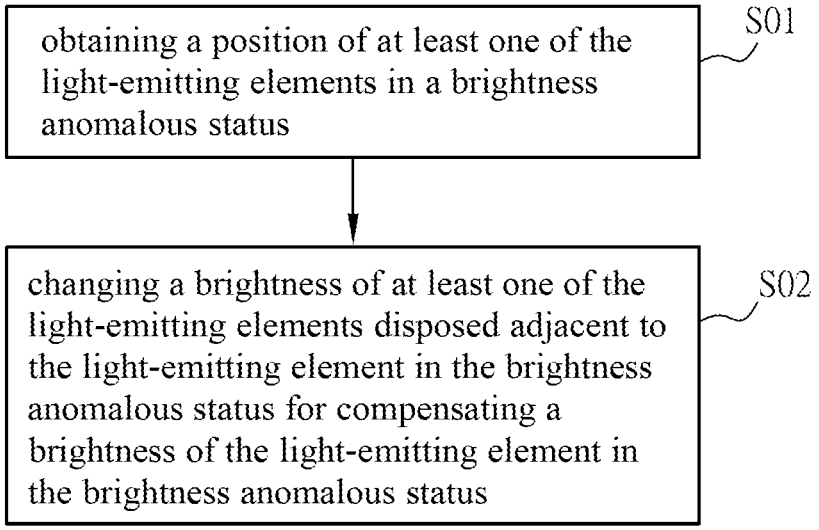
FIG. 1 is a flow chart showing a luminance compensation method of a light-emitting device according to an embodiment of this disclosure.

The light-emitting device of this disclosure is, for example but not limited to, a display device or a backlight module. FIG. 1 is a flow chart showing a luminance compensation method of a light-emitting device according to an embodiment of this disclosure, and FIG. 2 is a schematic diagram showing the light-emitting device D according to the embodiment.

Figure 2:
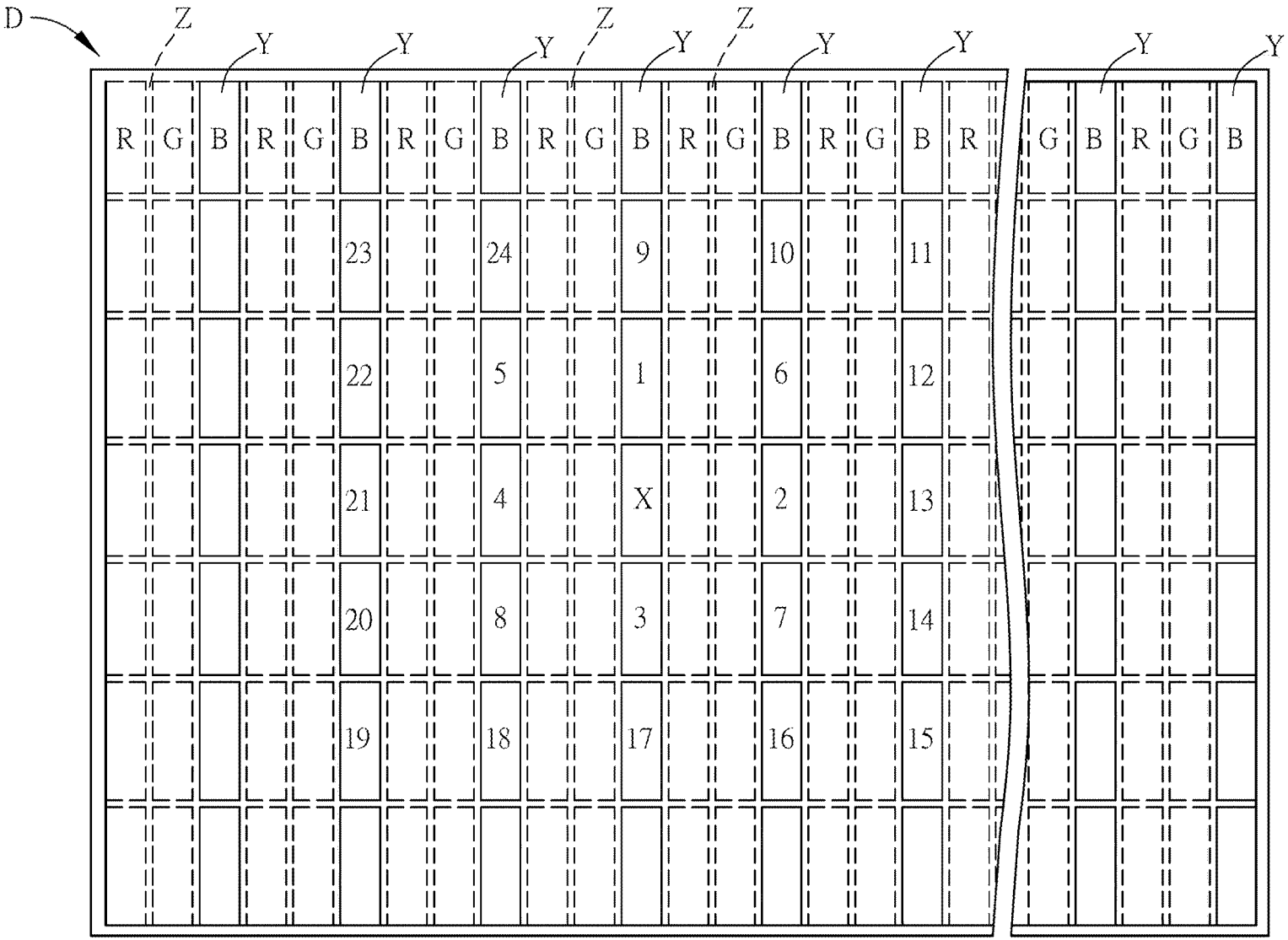
FIG. 2 is a schematic diagram showing the light-emitting device according to the embodiment.

Referring to FIG. 1 in view of FIG. 2, the light-emitting device D comprises a plurality of light-emitting elements. In this embodiment, the light-emitting elements can be Mini LEDs or Micro LEDs (μLED). In more detailed, the sides of the Mini LEDs are, for example, greater than 100 μm and less than or equal to 200 μm, and the sides of the Micro LEDs are, for example, less than or equal to 100 μm.

In this embodiment, the light-emitting device D is a Micro LED display device, and the light-emitting element is Micro LED. For example, the sides of the light-emitting element is 50 μm.

In this embodiment, the light-emitting device D (Micro LED display device) comprises a plurality of pixels Y (the dotted rectangular as shown in FIG. 2). The pixels Y have a plurality of light-emitting elements (Micro LEDs, not shown) for emitting light of the same color. Each pixel Y correspondingly has at least one Micro LED. In some embodiments, the light-emitting device (Micro LED display device) can be a monochromatic display device, so that all pixels have the same color. In some embodiments, the pixels of the light-emitting device D (Micro LED display device) can display three colors (e.g. red (R), green (G) and blue (B)), or four colors (e.g. red, green, blue, and one of cyan (C), yellow (Y) and white (W)). This disclosure is not limited. The above-mentioned pixels may be arranged in a stripe, a delta, or a mosaic. As shown in FIG. 2, the pixels of the light-emitting device D (Micro LED display device) of the present embodiment is arranged in a stripe, and the light-emitting device D has a plurality of pixels that can display three colors (R, G, B) as an example. In this case, the pixel Y has one of the three colors.

The luminance compensation method of this disclosure can detect and compensate each pixel (light-emitting element) of each color. In the following example, the luminance compensation method of this disclosure is used to compensate the luminance of the light-emitting element of a pixel Y (of a certain color).

In the light-emitting device D of FIG. 2, each pixel Y, for example, corresponds to one Micro LED. In this embodiment, the Micro LED in the normal brightness status corresponds to the pixel Y, and the Micro LED in the brightness anomalous status corresponds to the pixel X. In the following descriptions, the position of the Micro LED is also the position of the corresponding pixel.

As shown in FIG. 1, the luminance compensation method includes a step S01, which is to obtain a position of at least one of the light-emitting elements in a brightness anomalous status. To be noted, the position of the "light-emitting element in a brightness anomalous status" corresponds to a dark spot or a bright spot. In other words, the brightness anomalous status includes two situations. When utilizing the same preset gray-level value to drive the light-emitting elements of the same color, the dark spot has a brightness lower than the normal brightness, and the bright spot has a brightness higher than the normal brightness. These two situations are all considered as the brightness anomalous status. In practice, when utilizing the same preset gray-level value to drive the light-emitting elements (Micro LEDs) of the same color, the brightnesses of different light-emitting elements may have slightly variations. Accordingly, the light-emitting element in the brightness anomalous status can also be defined as the position of the light-emitting element with a visible distinct brightness or having a brightness out of range of ±10% of the average brightness of the light-emitting elements in the same color.

Figure 3:
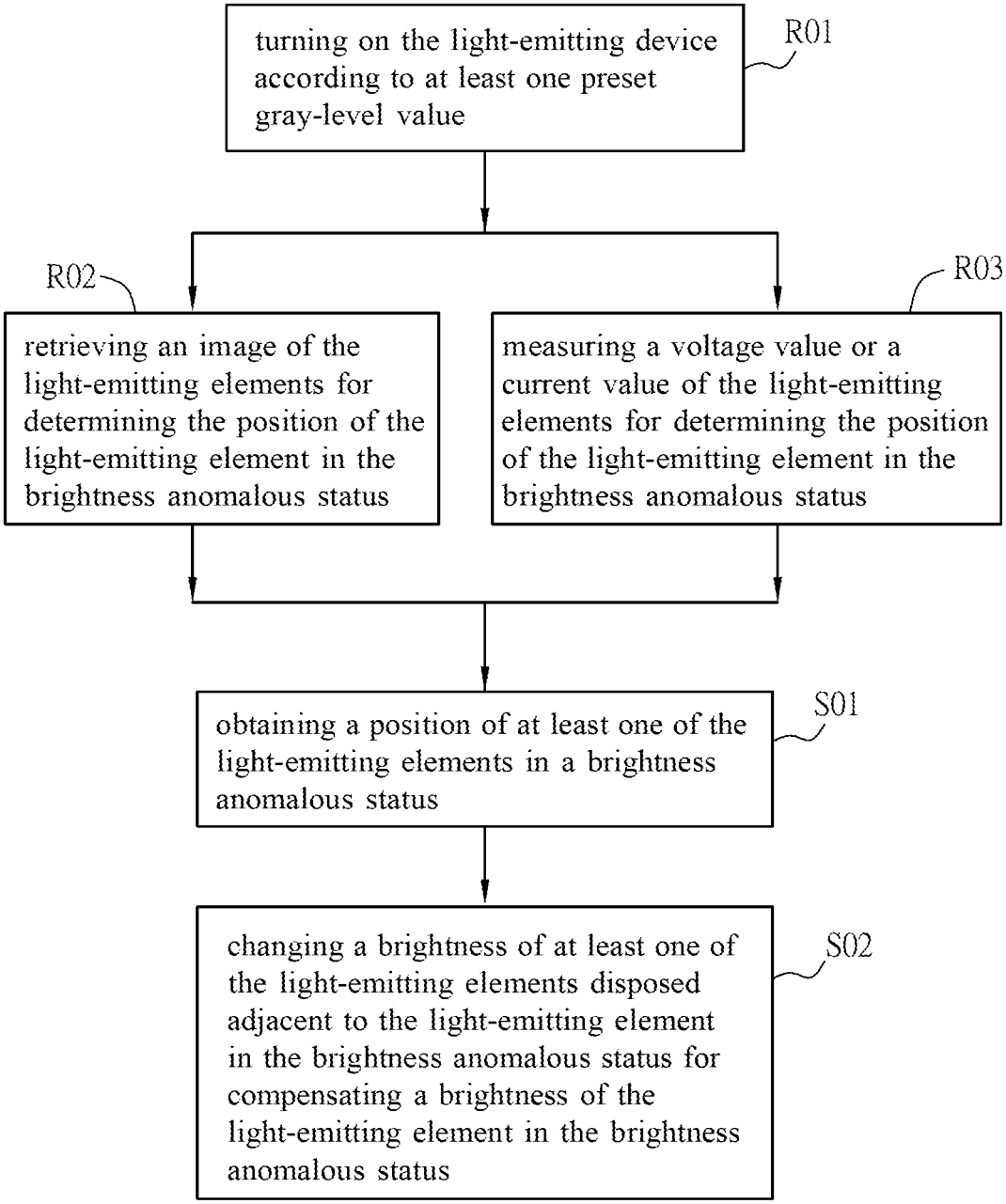
FIG. 3 is a flow chart showing another luminance compensation method of a light-emitting device according to an embodiment of this disclosure.

In the step S01, a position of one light-emitting element in a brightness anomalous status (the position of the pixel X) is obtained before compensating the brightness of the light-emitting element in the brightness anomalous status (the pixel X). FIG. 3 is a flow chart showing another luminance compensation method of a light-emitting device according to the embodiment of this disclosure. As shown in FIG. 3, before the steps S01 and S02 of FIG. 1, the luminance compensation method further comprises two steps including steps R01 and R02 or steps R01 and R03. Alternatively, before the steps S01 and S02 of FIG. 1, the luminance compensation method further comprises three steps including steps R01, R02 and R03.

The step R01 is to turn on the light-emitting device D according to at least one preset gray-level value. Specifically, in this embodiment, it is necessary to turn on the Micro LEDs of the pixels Y of the same color with a preset gray-scale value for realizing the position of the pixel X (e.g. the position of the light-emitting element (Micro LED) in the brightness anomalous status). Wherein, if the brightness of the Micro LED of the pixel X is lower than the target brightness corresponding to the preset gray-scale value (the brightness of the Micro LED of the pixel Y), the pixel X is determined as a dark spot position. Otherwise, if the brightness of the Micro LED of the pixel X is higher than the target brightness corresponding to the preset gray-scale value (the brightness of the Micro LED of the pixel Y), the pixel X is determined as a bright spot position.

Afterwards, the step R02 is performed to retrieve an image of the light-emitting elements for determining the position of the light-emitting element in the brightness anomalous status. In this case, the image of the light-emitting elements can be retrieved by, for example but not limited to, a CCD (Charge-coupled device) image retrieving device (not shown), and the position of the light-emitting element in the brightness anomalous status can be determined according to the retrieved image.

Alternatively, after the step SR01 of turning on the light-emitting device D, the step SR03 is performed to measure a voltage value or a current value of the light-emitting elements for determining the position of the light-emitting element in the brightness anomalous status. In this case, a probe is provided to measure the voltage value or current value of the Micro LEDs. If the measuring result indicates that one Micro LED has a voltage value or current value out of the range of ±10% of the voltage value or current value of the normal Micro LEDs, the position of this Micro LED is determined as the position of the pixel X, thereby determining the position of the Micro LED in the brightness anomalous status.

Besides, the luminance compensation method of this embodiment may further comprise a step R03 for increasing the accuracy of determining the position of the light-emitting element in the brightness anomalous status. To be noted, the order of the step R02 and the step R03 is not limited.

Referring to FIG. 1, the position of the light-emitting element in the brightness anomalous status (e.g. the pixel X of FIG. 2) is obtained, the step S02 is performed to change a brightness of at least one of the light-emitting elements disposed adjacent to the light-emitting element in the brightness anomalous status for compensating a brightness of the light-emitting element in the brightness anomalous status. Specifically, this embodiment does not directly repair or replace the light-emitting element in the brightness anomalous status (high difficulty), but utilizes the light-emitting elements disposed adjacent to the light-emitting element in the brightness anomalous status for compensating the brightness of the light-emitting element in the brightness anomalous status. In practice, the step S02 may change a brightness peak or a duty cycle of the light-emitting elements disposed adjacent to the light-emitting element in the brightness anomalous status for compensating the brightness of the light-emitting element in the brightness anomalous status. For example, in the case of compensating a dark spot, the step S02 can increase the brightness peak or duty cycle of the light-emitting elements disposed adjacent to the light-emitting element in the brightness anomalous status for compensating the brightness of the dark spot. In the case of compensating a bright spot, the step S02 can decrease the brightness peak or duty cycle of the light-emitting elements disposed adjacent to the light-emitting element in the brightness anomalous status for compensating the brightness of the bright spot.

Regarding the pixel X of FIG. 2, in some embodiments, the luminance compensation can be performed according to the following rule. Assuming there are N of the light-emitting elements spaced from the light-emitting element in the brightness anomalous status by a first distance, the N light-emitting elements emit light with a color the same as the light-emitting element in the brightness anomalous status, and there are M of the light-emitting elements configured for compensating the light-emitting element in the brightness anomalous status. Wherein, M is less than or equal to N, and M and N are respectively an integer greater than or equal to 1. In this embodiment, when the light-emitting element in the brightness anomalous status has a luminance L1, and a difference between the luminance L1 and a normal luminance L is (L1−L), then a luminance of each of the M light-emitting elements configured for compensating the light-emitting element in the brightness anomalous status is between L and (L−(L1−L)).

For example, in one embodiment, there are 2 (N) of the Micro LEDs (the positions 1 and 3 or the positions 2 and 4) spaced from the pixel X by a first distance, and the two Micro LEDs emit light with a color the same as the Micro LED of the pixel X. Thus, at least one of the two Micro LEDs (the positions 1 and 3 or the positions 2 and 4) may emit light with an adjusted luminance, which is between L and (L−(L1−L)), for compensating the luminance of the pixel X. That is, the luminance of the Micro LEDs in the positions 1 and 3 or in the positions 2 and 4 is between L and (L−(L1−L)). Preferably, each of the Micro LEDs in the positions 1 and 3 or in the positions 2 and 4 can emit the light with the same luminance (L−(L1−L)/2) for compensating the luminance of the pixel X. Accordingly, when viewing by human eyes, the luminance of the abnormal Micro LED and the luminance of the normal Micro LEDs seem the same or almost the same.

In other embodiments, the luminance compensation can be performed according to the following rule. Assuming there are P of the light-emitting elements spaced from the light-emitting element in the brightness anomalous status by a second distance, the P light-emitting elements emit light with a color the same as the light-emitting element in the brightness anomalous status, and there are Q of the light-emitting elements configured for compensating the light-emitting element in the brightness anomalous status. Wherein, Q is less than or equal to P, and P and Q are respectively an integer greater than or equal to 1. In this embodiment, the light-emitting element in the brightness anomalous status has a luminance L2, a difference between the luminance L2 and a normal luminance L is (L2−L), and a luminance of each of the Q light-emitting elements configured for compensating the light-emitting element in the brightness anomalous status is between L and (L−(L2−L)).

For example, in one embodiment, there are 4 (P) of the Micro LEDs (the positions 5, 6, 7 and 8) spaced from the pixel X by a second distance, and the four Micro LEDs emit light with a color the same as the Micro LED of the pixel X. Thus, at least one of the four Micro LEDs (the positions 5, 6, 7 and 8) may emit light with an adjusted luminance, which is between L and (L−(L2−L)), for compensating the luminance of the pixel X. Preferably, each of the Micro LEDs in the positions 5, 6, 7 and 8 can emit the light with the same luminance (L−(L2−L)/4) for compensating the luminance of the pixel X. Accordingly, when viewing by human eyes, the luminance of the abnormal Micro LED and the luminance of the normal Micro LEDs seem the same or almost the same.

In some embodiments, the luminance of each of the Q Micro LEDs adjacent to the pixel X can be greater than or equal to the luminance of each of the M Micro LEDs adjacent to the pixel X. In other embodiments, the luminance of each of the Q Micro LEDs adjacent to the pixel X can be less than the luminance of each of the M Micro LEDs adjacent to the pixel X. This disclosure is not limited.

In some embodiments, all or at least one of the Micro LEDs in the positions 1~8 can be utilized to compensate the brightness of the pixel X. Alternatively, all or at least one of the Micro LEDs in the positions 1~24 as shown in FIG. 2 can be utilized to compensate the brightness of the pixel X. In other embodiments, the luminance compensation weight provided by the Micro LEDs disposed closer to the pixel X can be greater than the luminance compensation weight provided by the Micro LEDs disposed farther away from the pixel X. In other words, a Micro LED disposed closer to the pixel X has a larger luminance compensation weight, and a Micro LED disposed farther away from the pixel X has a smaller luminance compensation weight. This configuration can achieve a gradual compensation effect. Alternatively, the luminance compensation weight provided by the Micro LEDs disposed closer to the pixel X can be less than the luminance compensation weight provided by the Micro LEDs disposed farther away from the pixel X. This disclosure is not limited.

The above-mentioned luminance compensation method can be applied both of the dark spot and the bright spot. In addition, the above method of compensating the brightness of the light-emitting element in the brightness anomalous status by the surrounding light-emitting elements is for an example only, and is not to limit this disclosure.

Figure 4:
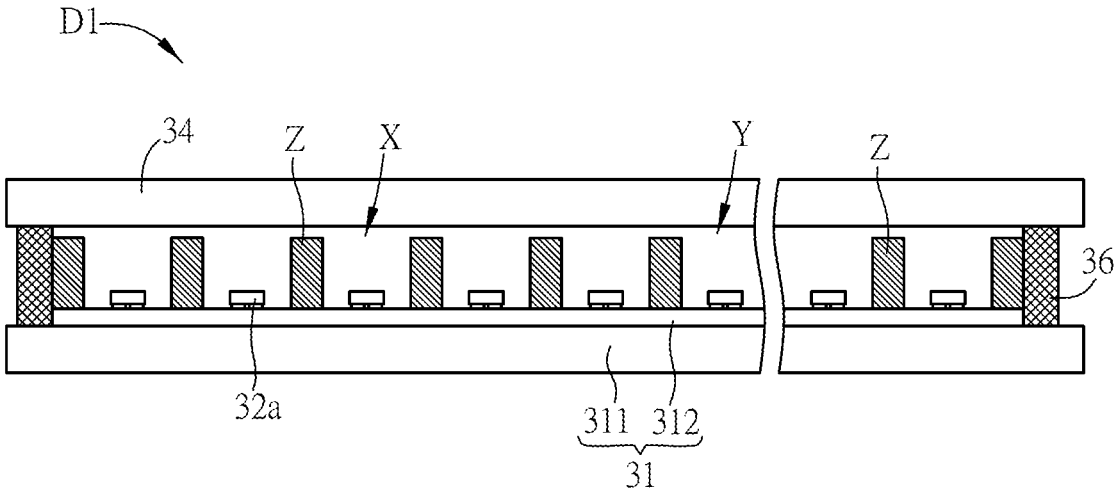
FIGS. 4 and 5 are schematic diagrams showing the light-emitting devices according to different embodiments.
Figure 5:
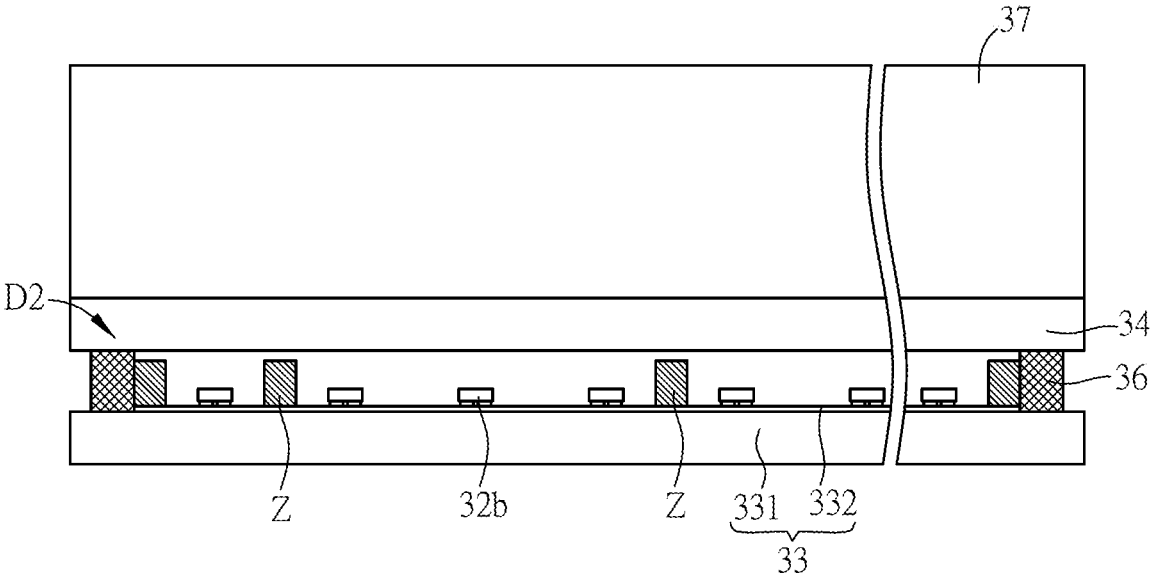

In some embodiments, as shown in FIG. 2, the light-emitting elements of the light-emitting device D may comprise a light-mixing preventing layer Z (e.g. a black matrix layer) for preventing the light mixing of two pixels. Accordingly, in some embodiments, before the step S02 for compensating the brightness of the light-emitting element in the brightness anomalous status, the luminance compensation method further comprises a step of: removing at least a part of a light-mixing preventing layer disposed between the light-emitting element in the brightness anomalous status and the at least one of the light-emitting elements disposed adjacent to the light-emitting element in the brightness anomalous status, so that the compensation light emitted from the light-emitting elements disposed adjacent to the light-emitting element in the brightness anomalous status can enter the position of the light-emitting element in the brightness anomalous status. FIGS. 4 and 5 are schematic diagrams showing the light-emitting devices D1~D2 according to different embodiments.

In the embodiment of FIG. 4, the light-emitting device D1 is, for example, a Micro LED display device. The light-emitting device D1 comprises a circuit substrate 31, a plurality of Micro LEDs 32a, and an opposite substrate 34. In addition, the light-emitting device D1 further comprises a light-mixing preventing layer Z.

The circuit substrate 31 can be an active matrix (AM) circuit substrate or a passive matrix (PM) circuit substrate, and the Micro LEDs 32a are disposed separately on the surface of the circuit substrate 31. In this embodiment, the circuit substrate 31 is an AM circuit substrate. The AM circuit substrate (circuit substrate 31) may comprise a substrate 311 and a matrix circuit 312, and the matrix circuit 312 is disposed on a surface of the substrate 311 facing the opposite substrate 34. The Micro LEDs 32a are separately disposed on the matrix circuit 312 and electrically connected with the matrix circuit 312. In this embodiment, the Micro LEDs 32a comprise blue, green and red Micro LEDs disposed on the matrix circuit 312 sequentially, and the matrix circuit 312 can control the blue, green and red Micro LEDs to emit blue light, green light and red light toward the opposite substrate 34. If the substrate 311 *is* a rigid substrate, it can be made of glass, metal or resin substrate, or composition substrate. If the substrate 311 *is* a flexible substrate, it can be made of organic polymer material. The glass transition temperature (Tg) of the organic polymer material can be, for example, between 250° C. and 600° C., and preferably between 300° C. and 500° C. The high glass transition temperature of the organic polymer material allows the flexible substrate to be subjected to the following thin-film process. The organic polymer material can be a thermoplastic material such as polyimide (PI), polyethylene (PE), polyvinylchloride (PVC), PS, acrylic, fluoropolymer, polyester, or nylon.

The opposite substrate 34 is disposed opposite to the circuit substrate 31, and the light-mixing preventing layer Z is disposed on the circuit substrate 31. The light shielding region of the light-mixing preventing layer Z may extend from the circuit substrate 31 to the opposite substrate 34 and may or may not contact the opposite substrate 34. The light shielding region of the light-mixing preventing layer Z of the present embodiment does not contact the opposite substrate 34 and has a distance departed from the opposite substrate 34. The light shielding regions of the light-mixing preventing layer Z disposed on the circuit substrate 31 are respectively disposed around the Micro LEDs 32a, respectively, so that one pixel Y can correspond to one Micro LED 32a, and light mixing effect of two adjacent Micro LEDs 32a can be prevented.

In this embodiment, since the opposite substrate 34 is a glass substrate, a sealant layer 36 is needed to be disposed at the outer peripheries of the circuit substrate 31 and the opposite substrate 34. The configuration of the sealant layer 36 can prevent external moisture and dusts from entering the internal space of the light-emitting device D1 and damaging the inside Micro LEDs 32a. In other embodiments, when the opposite substrate 34 is a protective adhesive layer or a protective film layer (e.g. epoxy), it can be coated to cover the Micro LEDs 32a for protecting the Micro LEDs 32a. In this case, the sealant layer 36 is not needed.

As mentioned above, before the step S02 for compensating a brightness of the light-emitting element in the brightness anomalous status, at least a part of the light-mixing preventing layer Z disposed between the light-emitting element in the brightness anomalous status (e.g. the Micro LEDs 32a in the position of pixel X) and the at least one of the light-emitting elements disposed adjacent to the light-emitting element in the brightness anomalous status is removed, so that the compensation light emitted from the light-emitting elements disposed adjacent to the light-emitting element in the brightness anomalous status can enter the position of the light-emitting element in the brightness anomalous status. For example, a laser can be provided from the bottom of the circuit substrate 31 (the side away from the light-emitting elements) and enter the light-emitting device D1 for removing at least a part of the light-mixing preventing layer Z disposed around the Micro LED 32a in the brightness anomalous status (the position of pixel X). For example, the Micro LEDs 32a participated to the luminance compensation. In this embodiment, each Micro LED 32a of the light-emitting device D1 (Micro LED display device) corresponds to one pixel, and the pixels are arranged in a stripe.

Regarding the RGB pixels arranged in stripes, the Micro LED 32a in the brightness anomalous status and the Micro LEDs 32a located at the upper position and the lower position of the Micro LED 32a in the brightness anomalous status have the same color (see FIG. 2, FIG. 3 corresponds to the light-emitting device D of FIG. 2, and FIG. 2 does not label 32a), and the Micro LED 32a in the brightness anomalous status and the Micro LEDs 32a located at the right position and the left position of the Micro LED 32a in the brightness anomalous status have different colors. Accordingly, in the step of removing at least a part of a light-mixing preventing layer Z disposed between the Micro LED 32a in the brightness anomalous status and at least one of the Micro LEDs 32a disposed adjacent to the Micro LED 32a in the brightness anomalous status, only at least a part of the light-mixing preventing layers Z disposed between the Micro LED 32a in the brightness anomalous status (pixel X) and the upper and lower Micro LEDs 32a (pixel Y), which have the same color as the pixel X, is removed. Alternatively, the light-mixing preventing layers Z disposed between the Micro LED 32a in the brightness anomalous status (pixel X) and the upper and lower Micro LEDs 32a (pixel Y), which have the same color as the pixel X, are removed. Accordingly, the luminance of pixel X can be compensated to be the same or almost the same as the luminance of the adjacent pixel Y with the same color.

In the embodiment of FIG. 5, the light-emitting device D2 is, for example, a backlight module, which can emit light to pass through a display panel 37, so that the display panel 37 can display an image. In this embodiment, the light-emitting device D2 may comprise a driving substrate 33, a plurality of Micro LEDs 32b, and an opposite substrate 34. In addition, the light-emitting device D2 may further comprise a light-mixing preventing layer Z and a sealant layer 36.

The driving substrate 33 comprises a substrate 331 and a driving circuit 332, and the driving circuit 332 is disposed on a surface of the substrate 331 facing the opposite substrate 34. The Micro LEDs 32b are separately disposed on the driving circuit 332 and electrically connected with the driving circuit 332. In this embodiment, the Micro LEDs 32b comprise Micro LEDs for emitting white light, which passes through opposite substrate 34 (e.g. a monochromatic or color filter substrate) and is emitted toward the display panel 37.

The opposite substrate 34 is disposed opposite to the driving substrate 33. Similar to the light-emitting device D1, the opposite substrate 34 of this embodiment is a glass substrate, so that a sealant layer 36 is needed to be disposed at the outer peripheries of the driving substrate 33 and the opposite substrate 34 for preventing the external moisture and dusts from entering the internal space of the light-emitting device D2 and damaging the inside Micro LEDs 32b. In other embodiments, when the opposite substrate 34 is a protective adhesive layer, the sealant layer 36 is not needed.

The light-mixing preventing layer Z and the opposite substrate 34 may or may not be in contact with each other, and this disclosure is not limited. In the present embodiment, the light shielding region of the light-mixing preventing layer Z is disposed around a plurality of Micro LEDs 32b within one region. Since the light shielding region of the light-mixing preventing layer Z is disposed around a plurality of Micro LEDs 32b, if one (or a few) of the Micro LEDs 32b in the region is abnormal, it is possible to compensate the luminance of the abnormal Micro LED 32b by other adjacent normal Micro LEDs 32b in the same region without removing the light-mixing preventing layer Z around the region. However, in other embodiments, it is also possible to utilize the normal Micro LEDs 32b in the adjacent regions for compensating the luminance of the abnormal Micro LED(s) 32b. In this case, at least a part of the light-mixing preventing layer Z between the adjacent two regions must be removed. For example, at least a part or all of the light-mixing preventing layer Z disposed around the region containing the abnormal Micro LED(s) 32b *can be removed*. Accordingly, when viewing by human eyes, the luminance of the abnormal region (containing the abnormal Micro LED(s) 32b) and the luminance of the normal regions seem the same or almost the same.

In summary, the luminance compensation method of a light-emitting device of this disclosure is to obtain a position of at least one of the light-emitting elements in a brightness anomalous status, and then to change a brightness of at least one of the light-emitting elements disposed adjacent to the light-emitting element in the brightness anomalous status for compensating a brightness of the light-emitting element in the brightness anomalous status. Accordingly, this disclosure does not directly repair or replace the light-emitting element in the brightness anomalous status, but utilizes the normal light-emitting elements disposed adjacent to the light-emitting element in the brightness anomalous status for compensating the brightness of the light-emitting element in the brightness anomalous status. As a result, the luminance compensation method of this disclosure can achieve the luminance compensation effect with lower repairing difficulty.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A luminance compensation method of a light-emitting device, wherein the light-emitting device comprises [a plurality of] light-emitting elements, the luminance compensation method comprising steps of:

obtaining a position of at least one [of the] light-emitting [elements] *element* in a brightness anomalous status, *among the light-emitting elements*; and changing a brightness of at least one of the light-emitting elements disposed adjacent to the light-emitting element in the brightness anomalous status for compensating a brightness of the light-emitting element in the brightness anomalous status, wherein there are N of the light-emitting elements spaced from the light-emitting element in the brightness anomalous status by a first distance, the N light-emitting elements emit light with a *same* color [the same] as the light-emitting element in the brightness anomalous status, *and* there are M of the light-emitting elements configured for compensating the light-emitting element in the brightness anomalous status, *where* M is less than or equal to N, and M and N are respectively an integer greater than or equal to 1, and wherein the light-emitting element in the brightness anomalous status has a luminance L1, a difference between the luminance L1 and a normal luminance L is (L1−L), and a luminance of each of the M light-emitting elements configured for compensating the light-emitting element in the brightness anomalous status is between L and (L−(L1−L)).

2. The luminance compensation method according to claim 1, wherein the position of the light-emitting element in the brightness anomalous status corresponds to a dark spot or a bright spot.

3. The luminance compensation method according to claim 1, before the step of obtaining the position of at least one [of the] light-emitting [elements] *element* in the brightness anomalous status, further comprising a step of:

turning on the light-emitting device according to at least one preset gray-level value.

4. The luminance compensation method according to claim 3, after the step of turning on the light-emitting device according to the preset gray-level value, further comprising a step of:

retrieving an image of the light-emitting elements for determining the position of the light-emitting element in the brightness anomalous status.

5. The luminance compensation method according to claim 3, after the step of turning on the light-emitting device according to the preset gray-level value, further comprising a step of:

measuring a voltage value or a current value of the light-emitting elements for determining the position of the light-emitting element in the brightness anomalous status.

6. The luminance compensation method according to claim 1, wherein the step of changing the brightness of at least one of the light-emitting elements disposed adjacent to the light-emitting element in the brightness anomalous status for compensating the brightness of the light-emitting element in the brightness anomalous status is to change a brightness peak or a duty cycle of the at least one of the light-emitting elements disposed adjacent to the light-emitting element in the brightness anomalous status.

7. The luminance compensation method according to [claim] *claim 1,* wherein there are P of the light-emitting elements spaced from the light-emitting element in the brightness anomalous status by a second distance, the P light-emitting elements emit light with a *same* color [the same] as the light-emitting element in the brightness anomalous status, *and* there are Q of the light-emitting elements configured for compensating the light-emitting element in the brightness anomalous status, *where* Q is less than or equal to P, and P and Q are respectively an integer greater than or equal to 1.

8. The luminance compensation method according to claim 7, wherein the light-emitting element in the brightness anomalous status has a luminance L2, a difference between the luminance L2 and [a] *the* normal luminance L is (L2−L), and a luminance of each of the Q light-emitting elements configured for compensating the light-emitting element in the brightness anomalous status is between L and (L−(L2−L)).

9. The luminance compensation method according to claim 1, before the step of changing the brightness of at least one of the light-emitting elements disposed adjacent to the light-emitting element in the brightness anomalous status for compensating the brightness of the light-emitting element in the brightness anomalous status, further comprising a step of:

removing at least a part of a light-mixing preventing layer disposed between the light-emitting element in the brightness anomalous status and the at least one of the light-emitting elements disposed adjacent to the light-emitting element in the brightness anomalous status.

10. The luminance compensation method according to claim 1, wherein *each of* the light-emitting [element] *elements* is a Mini LED or a Micro LED.

[11. A luminance compensation method of a light-emitting device, wherein the light-emitting device comprises a plurality of light-emitting elements, the luminance compensation method comprising:

obtaining a position of at least one of the light-emitting elements in a brightness anomalous status;

removing at least a part of a light-mixing preventing layer disposed between the light-emitting element in the brightness anomalous status and the at least one of the light-emitting elements disposed adjacent to the light-emitting element in the brightness anomalous status, so that a compensation light emitted from the at least one of the light-emitting elements disposed adjacent to the light-emitting element in the brightness anomalous status enters a position of the light-emitting element in the brightness anomalous status; and changing a brightness of at least one of the light-emitting elements disposed adjacent to the light-emitting element in the brightness anomalous status for compensating a brightness of the light-emitting element in the brightness anomalous status.]

[12. The luminance compensation method according to claim 11, wherein the position of the light-emitting element in the brightness anomalous status corresponds to a dark spot or a bright spot.]

[13. The luminance compensation method according to claim 11, before said obtaining the position of at least one of the light-emitting elements in the brightness anomalous status, further comprising:

turning on the light-emitting device according to at least one preset gray-level value.]

[14. The luminance compensation method according to claim 13, after said turning on the light-emitting device according to the preset gray-level value, further comprising:

retrieving an image of the light-emitting elements for determining the position of the light-emitting element in the brightness anomalous status.]

[15. The luminance compensation method according to claim 13, after said turning on the light-emitting device according to the preset gray-level value, further comprising:

measuring a voltage value or a current value of the light-emitting elements for determining the position of the light-emitting element in the brightness anomalous status.]

[16. The luminance compensation method according to claim 11, wherein said changing the brightness of at least one of the light-emitting elements disposed adjacent to the light-emitting element in the brightness anomalous status for compensating the brightness of the light-emitting element in the brightness anomalous status is to change a brightness peak or a duty cycle of the at least one of the light-emitting elements disposed adjacent to the light-emitting element in the brightness anomalous status.]

[17. The luminance compensation method according to claim 11, wherein there are N of the light-emitting elements spaced from the light-emitting element in the brightness anomalous status by a first distance, the N light-emitting elements emit light with a color the same as the light-emitting element in the brightness anomalous status, there are M of the light-emitting elements configured for compensating the light-emitting element in the brightness anomalous status, M is less than or equal to N, and M and N are respectively an integer greater than or equal to 1.]

[18. The luminance compensation method according to claim 17, wherein the light-emitting element in the brightness anomalous status has a luminance L1, a difference between the luminance L1 and a normal luminance L is (L1−L), and a luminance of each of the M light-emitting elements configured for compensating the light-emitting element in the brightness anomalous status is between L and (L−(L1−L)).]

[19. The luminance compensation method according to claim 17, wherein there are P of the light-emitting elements spaced from the light-emitting element in the brightness anomalous status by a second distance, the P light-emitting elements emit light with a color the same as the light-emitting element in the brightness anomalous status, there are Q of the light-emitting elements configured for compensating the light-emitting element in the brightness anomalous status, Q is less than or equal to P, and P and Q are respectively an integer greater than or equal to 1, wherein the light-emitting element in the brightness anomalous status has a luminance L2, a difference between the luminance L2 and a normal luminance L is (L2−L), and a luminance of each of the Q light-emitting elements configured for compensating the light-emitting element in the brightness anomalous status is between L and (L−(L2−L)).]

[20. The luminance compensation method according to claim 11, wherein the light-emitting element is a Mini LED or a Micro LED.]

*21. The luminance compensation method according to claim 1, wherein the light-emitting device comprises a plurality of pixels, and each of the plurality of pixels comprises at least one of the light-emitting elements.*

*22. The luminance compensation method according to claim 21, wherein the plurality of pixels are arranged in a stripe shape, a delta shape, or a mosaic shape.*

*23. The luminance compensation method according to claim 1, wherein the light-emitting element in the brightness anomalous status has a brightness out of a range of ±10% of an average brightness of the N light-emitting elements in the same color.*

*24. The luminance compensation method according to claim 1, wherein the light-emitting device further comprises:*

*a first substrate having a surface on which the light-emitting elements are disposed; and*

*a second substrate disposed opposite the first substrate, wherein the light-emitting elements are disposed between the first substrate and the second substrate.*

*25. The luminance compensation method according to claim 24, wherein the first substrate comprises an active matrix circuit substrate.*

*26. The luminance compensation method according to claim 24, wherein the first substrate comprises a matrix circuit configured to drive at least one of the light-emitting elements.*

*27. The luminance compensation method according to claim 24, wherein the light-emitting device further comprises a light-mixing preventing layer disposed between the first substrate and the second substrate.*

*28. The luminance compensation method according to claim 27, wherein the light-mixing preventing layer comprises a black matrix layer.*

*29. The luminance compensation method according to claim 27, wherein the light-mixing preventing layer extends from the first substrate to the second substrate, and wherein the light-mixing preventing layer is separated from the second substrate and does not contact the second substrate.*

*30. The luminance compensation method according to claim 24, wherein the light-emitting device further comprises a sealant layer disposed at outer peripheries of the first substrate and the second substrate.*

*31. The luminance compensation method according to claim 24, wherein the light-emitting device comprises an adhesive layer or a film layer.*

*32. The luminance compensation method according to claim 1, wherein the luminance of each of the M light-emitting elements is set to be (L-(L1-L)/2).*

*33. The luminance compensation method according to claim 5, further comprising determining a position of a first light-emitting element as the position of the light-emitting element in the brightness anomalous status when a measurement of a voltage value or a current value of the first light-emitting element is out of a range of ±10% of a corresponding voltage value or current value of the N light-emitting elements.*

*34. The luminance compensation method according to claim 5, wherein the light-emitting element in the brightness anomalous status has a brightness lower than a corresponding brightness of the N light-emitting elements.*

* * * * *